(12) United States Patent
Itou et al.

(10) Patent No.: US 11,900,316 B2
(45) Date of Patent: Feb. 13, 2024

(54) INFORMATION PROCESSING APPARATUS, CONTROL METHOD, AND PROGRAM

(71) Applicant: NEC Corporation, Tokyo (JP)

(72) Inventors: Yoshihiro Itou, Tokyo (JP); Kanako Taga, Tokyo (JP); Takenobu Kitahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 25 days.

(21) Appl. No.: 17/675,113

(22) Filed: Feb. 18, 2022

(65) Prior Publication Data

US 2022/0172157 A1 Jun. 2, 2022

Related U.S. Application Data

(63) Continuation of application No. 16/744,947, filed on Jan. 16, 2020, now Pat. No. 11,288,627, which is a
(Continued)

(30) Foreign Application Priority Data

Sep. 30, 2014 (JP) .................................. 2014-201363

(51) Int. Cl.
*G06Q 10/087* (2023.01)
*G06Q 30/06* (2023.01)
(Continued)

(52) U.S. Cl.
CPC ........... *G06Q 10/087* (2013.01); *B65G 1/137* (2013.01); *G06Q 30/06* (2013.01); *G06V 20/20* (2022.01); *G06V 20/52* (2022.01)

(58) Field of Classification Search
CPC ...... G06Q 10/087; G06Q 30/06; B65G 1/137; G06V 20/20; G06V 20/52
See application file for complete search history.

(56) References Cited

U.S. PATENT DOCUMENTS 5,493,107 A * 2/1996 Gupta ................ G06K 7/10861
235/462.46
5,848,399 A * 12/1998 Burke .................. G06Q 10/087
705/28
(Continued)

FOREIGN PATENT DOCUMENTS

JP   2001-247209 A   9/2001
JP   2009189736 A    8/2009
(Continued)

OTHER PUBLICATIONS

Ferreira Chaves, Leonardo, Erik Buchmann, and Klemens Bohm. "Finding Misplaced Items in Retail by Clustering RFID Data." Proceedings of the 13th International Conference on Extending Database Technology. ACM, 2010. 501-512. Web. (Year: 2010).*
(Continued)

*Primary Examiner* — Ashford S Hayles

(57) ABSTRACT

An information processing apparatus (2000) includes a product recognition unit (2020), a shelf label recognition unit (2040), and a determination unit (2060). The product recognition unit (2020) recognizes the number of types of products or positions of each type of products from a target image. The shelf label recognition unit (2040) recognizes the number or positions of shelf labels indicating information of the products from the target image. The determination unit (2060) determines whether or not there is an error in a relationship between the recognized number of types of products and the recognized number of shelf labels or in a relationship between the recognized positions of each type of products and the recognized positions of the shelf labels.

7 Claims, 12 Drawing Sheets

Related U.S. Application Data continuation of application No. 15/506,299, filed as application No. PCT/JP2015/077268 on Sep. 28, 2015, now Pat. No. 10,579,962.

(51) Int. Cl.
*G06V 20/20* (2022.01)
*G06V 20/52* (2022.01)
*B65G 1/137* (2006.01)

(56) References Cited

U.S. PATENT DOCUMENTS

| | | | | |
|---|---|---|---|---|
| 7,427,014 B2 | 9/2008 | Kimura | | G06Q 30/02 |
| | | | | 235/375 |
| 8,577,136 B1* | 11/2013 | Ascher | | G06Q 10/087 |
| | | | | 382/165 |
| 8,725,595 B1* | 5/2014 | Siegel | | G06Q 10/087 |
| | | | | 705/28 |
| 8,923,893 B2* | 12/2014 | Austin | | H04W 4/02 |
| | | | | 455/457 |
| 8,930,235 B2* | 1/2015 | Mihic | | G06Q 10/04 |
| | | | | 705/7.29 |
| 9,785,898 B2* | 10/2017 | Hofman | | G06Q 10/06315 |
| 9,886,678 B2* | 2/2018 | Yan | | G06Q 10/087 |
| 2002/0143672 A1* | 10/2002 | Sawasaki | | G06Q 10/087 |
| | | | | 705/29 |
| 2002/0147597 A1* | 10/2002 | Connors | | G06Q 10/0875 |
| | | | | 705/29 |
| 2003/0033217 A1* | 2/2003 | Cutlip | | G06Q 30/0601 |
| | | | | 705/26.1 |
| 2003/0036985 A1* | 2/2003 | Soderholm | | G06K 17/0022 |
| | | | | 705/28 |
| 2003/0154141 A1* | 8/2003 | Capazario | | G06Q 10/087 |
| | | | | 705/26.1 |
| 2004/0133483 A1* | 7/2004 | Potter | | G06Q 10/087 |
| | | | | 705/28 |
| 2005/0021561 A1* | 1/2005 | Noonan | | G06Q 20/203 |
| 2005/0030158 A1* | 2/2005 | Schulmerich | | G06F 3/1462 |
| | | | | 340/5.91 |
| 2005/0203790 A1* | 9/2005 | Cohen | | G06Q 30/02 |
| | | | | 705/7.31 |
| 2005/0256726 A1* | 11/2005 | Benson | | G06Q 10/0637 |
| | | | | 705/28 |
| 2006/0190341 A1* | 8/2006 | Riley | | G06Q 30/0601 |
| | | | | 705/1.1 |
| 2007/0288296 A1* | 12/2007 | Lewis | | G06Q 30/02 |
| | | | | 186/52 |
| 2008/0077511 A1* | 3/2008 | Zimmerman | | G06Q 10/087 |
| | | | | 705/28 |
| 2008/0144934 A1* | 6/2008 | Raynaud | | G06F 18/00 |
| | | | | 382/173 |
| 2008/0203790 A1 | 8/2008 | Cohen | | G06C 30/0202 |
| | | | | 706/7.31 |
| 2008/0208719 A1* | 8/2008 | Sharma | | G06Q 10/0875 |
| | | | | 700/32 |
| 2008/0306787 A1* | 12/2008 | Hamilton | | G06Q 10/0639 |
| | | | | 705/7.38 |
| 2009/0059270 A1* | 3/2009 | Opalach | | G06V 20/64 |
| | | | | 358/1.15 |
| 2009/0063306 A1* | 3/2009 | Fano | | G06Q 10/087 |
| | | | | 705/28 |
| 2009/0063307 A1* | 3/2009 | Groenovelt | | G06Q 10/087 |
| | | | | 705/28 |
| 2009/0094140 A1* | 4/2009 | Kwan | | G06Q 30/06 |
| | | | | 705/28 |
| 2009/0192921 A1* | 7/2009 | Hicks | | G06Q 10/087 |
| | | | | 715/764 |
| 2010/0070388 A1* | 3/2010 | Spindler | | G06Q 10/087 |
| | | | | 707/609 |
| 2010/0138322 A1* | 6/2010 | Nakamura | | G06Q 30/02 |
| | | | | 705/28 |
| 2010/0171826 A1* | 7/2010 | Hamilton | | H04N 7/188 |
| | | | | 348/135 |
| 2010/0217681 A1* | 8/2010 | Geikie | | G06Q 30/0601 |
| | | | | 705/26.1 |
| 2011/0011936 A1* | 1/2011 | Morandi | | G06Q 10/087 |
| | | | | 235/454 |
| 2011/0035257 A1* | 2/2011 | Solanki | | G06Q 10/043 |
| | | | | 705/7.31 |
| 2011/0050396 A1* | 3/2011 | Chaves | | G06Q 10/087 |
| | | | | 340/10.1 |
| 2011/0066458 A1* | 3/2011 | Dale | | G06Q 30/02 |
| | | | | 705/1.1 |
| 2011/0295764 A1* | 12/2011 | Cook | | G06Q 30/02 |
| | | | | 705/348 |
| 2012/0022913 A1* | 1/2012 | Volkmann | | G06Q 10/087 |
| | | | | 705/28 |
| 2012/0223943 A1* | 9/2012 | Williams | | G06Q 30/06 |
| | | | | 345/173 |
| 2012/0323620 A1* | 12/2012 | Hofman | | G06Q 10/087 |
| | | | | 705/7.11 |
| 2012/0324515 A1* | 12/2012 | Dashevskiy | | H04N 21/42224 |
| | | | | 725/78 |
| 2013/0076726 A1* | 3/2013 | Ferrara | | G06V 20/653 |
| | | | | 345/418 |
| 2013/0119138 A1* | 5/2013 | Winkel | | G06Q 10/087 |
| | | | | 235/462.1 |
| 2013/0147839 A1* | 6/2013 | Fukushima | | G06Q 30/06 |
| | | | | 345/633 |
| 2013/0155815 A1* | 6/2013 | Wulff | | G06K 19/0728 |
| | | | | 367/99 |
| 2013/0173435 A1* | 7/2013 | Cozad, Jr. | | G06Q 10/087 |
| | | | | 705/28 |
| 2013/0204750 A1* | 8/2013 | Nordman | | G06Q 20/203 |
| | | | | 705/28 |
| 2013/0226825 A1* | 8/2013 | Hathaway | | G06Q 30/02 |
| | | | | 705/348 |
| 2013/0235206 A1* | 9/2013 | Smith | | G06Q 10/087 |
| | | | | 348/150 |
| 2013/0275277 A1* | 10/2013 | Mihic | | G06Q 10/04 |
| | | | | 705/28 |
| 2013/0325533 A1 | 12/2013 | Shin | | |
| 2014/0045515 A1* | 2/2014 | Austin | | H04W 4/02 |
| | | | | 455/456.1 |
| 2014/0058781 A1* | 2/2014 | Padmanabhan | | G06Q 30/0202 |
| | | | | 705/7.22 |
| 2014/0129354 A1* | 5/2014 | Soon-Shiong | | G06F 3/0484 |
| | | | | 705/16 |
| 2014/0129395 A1* | 5/2014 | Groenovelt | | G06Q 10/087 |
| | | | | 705/28 |
| 2014/0201040 A1* | 7/2014 | Birch | | G06F 3/147 |
| | | | | 705/28 |
| 2014/0304124 A1* | 10/2014 | Amelmann | | G06Q 10/087 |
| | | | | 705/28 |
| 2014/0344118 A1* | 11/2014 | Parpia | | G06Q 10/087 |
| | | | | 705/28 |
| 2015/0046299 A1* | 2/2015 | Yan | | G06Q 10/087 |
| | | | | 705/28 |
| 2015/0052027 A1* | 2/2015 | Pavani | | G06F 18/22 |
| | | | | 705/28 |
| 2015/0086701 A1 | 3/2015 | Desmarais | | G06Q 10/087 |
| | | | | 705/28 |
| 2015/0088701 A1* | 3/2015 | Desmarais | | G06Q 10/087 |
| | | | | 705/28 |
| 2015/0088703 A1* | 3/2015 | Yan | | G06Q 10/087 |
| | | | | 705/28 |
| 2015/0123973 A1* | 5/2015 | Larsen | | G06T 15/04 |
| | | | | 345/427 |
| 2015/0166210 A1* | 6/2015 | Schram | | G06Q 90/00 |
| | | | | 206/459.5 |
| 2015/0220784 A1* | 8/2015 | Gold | | G06V 20/10 |
| | | | | 382/153 |
| 2015/0363625 A1* | 12/2015 | Wu | | G06V 20/10 |
| | | | | 382/203 |

(56) References Cited

U.S. PATENT DOCUMENTS

| | | | | |
|---|---|---|---|---|
| 2015/0363758 A1* | 12/2015 | Wu | ................... | G06Q 10/087 |
| | | | | 705/20 |
| 2016/0224857 A1* | 8/2016 | Zhang | ................... | G06F 18/253 |
| 2017/0293960 A1* | 10/2017 | Stout | ................... | G06Q 30/06 |

FOREIGN PATENT DOCUMENTS

| | | | | |
|---|---|---|---|---|
| JP | 2010-238007 | | 10/2010 | |
| JP | 2011-093672 A | | 5/2011 | |
| JP | 2012053711 A | * | 3/2012 | |
| JP | 2012-174154 A | | 9/2012 | |
| JP | 2013-54627 A | | 3/2013 | |
| JP | 2013-250647 | | 12/2013 | |
| JP | 5372396 B2 | | 12/2013 | ............. G07G 1/009 |
| JP | 2014-048752 | | 3/2014 | |
| WO | WO-2014087725 A1 | | 6/2014 | ......... G06Q 30/0201 |

OTHER PUBLICATIONS

Communication dated Nov. 26, 2019, from the Japanese Patent Office in counterpart application No. 2017-250637.

International Search Report for PCT Application No. PCT/JP2015/077268, dated Oct. 27, 2015.

Papkiriakopoulos, Dimitris, "Developing a Mechanism to Support Decisions for Products Missing from the Self." Journal of decision systems 20.4 (2011): 417-441. Web. (Year: 2011).

JP Office Action for JP Application No. 2022-126907, dated Oct. 3, 2023 with English Translation.

* cited by examiner

INFORMATION PROCESSING APPARATUS, CONTROL METHOD, AND PROGRAM

CROSS-REFERENCE TO RELATED APPLICATIONS

The present application is a continuation application of U.S. patent application Ser. No. 16/744,947 filed on Jan. 16, 2020, which is a continuation application of U.S. patent application Ser. No. 15/506,299 filed on Feb. 24, 2017, which issued as U.S. Pat. No. 10,579,962, which is a National Stage Entry of international application PCT/JP2015/077268, filed on Sep. 28, 2015, which claims the benefit of priority from Japanese Patent Application 2014-201363 filed on Sep. 30, 2014, the disclosures of all of which are incorporated in their entirety by reference herein.

TECHNICAL FIELD

The present invention relates to an information processing apparatus, a control method, and a program.

BACKGROUND ART

On a product shelving in a store, there is a shelf label near a product that describes information such as a name or price of the product. In recent years, a system for supporting management of such the shelf label is developed.

Patent Document 1 discloses a system in which store shelves have store labels that display product information and shelf label identification information, and the system performs: imaging shelf label identification information of each shelf label with a camera, recognizing the imaged shelf label, and managing the shelf label. Specifically, this system generates a map representing a position of each shelf label, or detects the shelf label the expiration date for use of which has been expired and reports the detected shelf label.

RELATED DOCUMENT

Patent Document

[Patent Document 1] Japanese Patent Application Publication No. 2014-48752

SUMMARY OF THE INVENTION

Technical Problem

It is necessary to re-arrange, add or reduce the shelf labels according to a change of a line-up of products in a store. In addition, the position of the shelf label is sometimes shifted erroneously by a customer or a salesperson, and the position of the shelf label has to be corrected in such a case. If the customer or salesperson forgets to change the arrangement of shelf labels or makes a mistake in changing of the arrangement of shelf labels, the number or positional relationship between the shelf label and the product becomes inconsistent, and it causes a problem that the customer is not able to appropriately recognize the information of the product. The system of Patent Document 1 does not disclose a technology for managing the consistency on the number or positional relationship between the shelf label and the product.

The invention has been made in view of the aforementioned problems. The present invention provides a technology for supporting the checking of arrangement of products or shelf labels.

Solution to Problem

An information processing apparatus provided by the present invention includes: a product recognition unit recognizing a number of types of products or positions of each type of products from an image on which the products and shelf labels are imaged; a shelf label recognition unit recognizing a number or positions of shelf labels indicating information of each product from the image; and a determination unit determining whether or not there is an error in a relationship between the recognized number of types of products and the recognized number of shelf labels or in a relationship between the recognized positions of each type of products and the recognized positions of the shelf labels.

A control method provided by the present invention is performed by a computer. The control method includes: a product recognition step of recognizing a number of types of products or positions of each type of products from an image on which the products and shelf labels are imaged; a shelf label recognition step of recognizing a number or positions of shelf labels indicating information of the products from the image; and a determination step of determining whether or not there is an error in a relationship between the recognized number of types of products and the recognized number of shelf labels or in a relationship between the recognized positions of each type of products and the recognized positions of the shelf labels.

A program provided by the present invention causes a computer to have a function of operating as the information processing apparatus provided by the present invention.

Advantageous Effects of Invention

According to the present invention, a technology for supporting the checking of arrangement of products or shelf labels is provided.

BRIEF DESCRIPTION OF THE DRAWINGS

The above objects, other objects, advantages and features will be more apparent from the following description of certain preferred embodiments taken in conjunction with the accompanying drawings.

DESCRIPTION OF EMBODIMENTS

Figure 1:
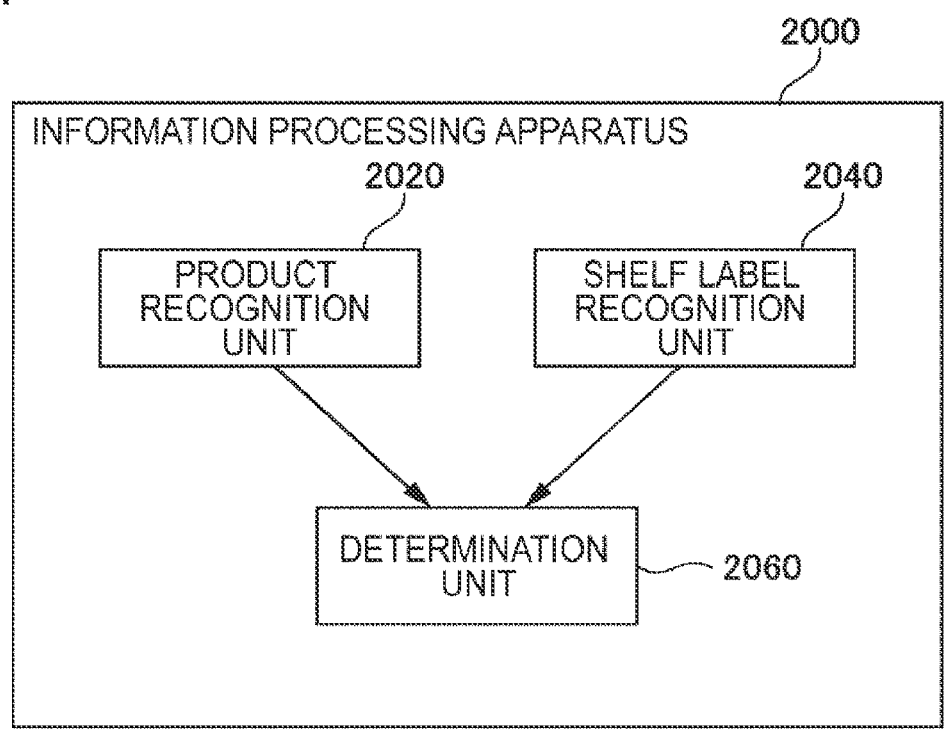
FIG. 1 is a block diagram illustrating an information processing apparatus according to Exemplary Embodiment 1.

Hereinafter, exemplary embodiments of the present invention will be described with reference to the drawings. In all the drawings, the same components will be assigned the same reference numerals, and the description thereof will not be appropriately repeated.

Exemplary Embodiment 1

FIG. 1 is a block diagram illustrating an information processing apparatus 2000 according to Exemplary Embodiment 1. In FIG. 1, arrows represent information flows. In FIG. 1, each block depicts not a configuration of a hardware unit but a configuration of a functional unit.

The information processing apparatus 2000 includes a product recognition unit 2020, a shelf label recognition unit 2040, and a determination unit 2060. The product recognition unit 2020 recognizes the number of types of products or positions of each type of products from an image (hereinafter, referred to as a target image) on which products and shelf labels are imaged.

Here, "recognizing the number of types of products" means recognizing a group of products having the same type as one type when that products having the same type are placed with being adjacent to one another. For example, suppose that three columns of Products A, two columns of Products B, and two columns of Products C are sequentially placed. In this case, the number of types of products is three. Hereinafter, the group of products having the same type arranged so as to be adjacent to one another as stated above is described as a product group. Note that, the number of products included in the product group may be one.

The "positions of each type of products" means positions of the product groups. More specifically, in a case where three columns of Products A, two columns of Products B, and two columns of Products C are sequentially placed, the position of the product group of Products A, the position of the product group of Products B, and the position of the product group of Product C are the "positions of each type of products". Concrete methods of how to represent the "position of the product group" or the like will be described below.

The shelf label recognition unit 2040 recognizes from the target image the number or positions of the shelf labels that indicate information of each product.

The determination unit 2060 determines an error in the relationship between the number of the recognized types of products (the number of product groups) and the number of shelf labels or the relationship between the positions of each type of products (the positions of the product groups) and the shelf label.

<Flow of Processes>

Figure 2:
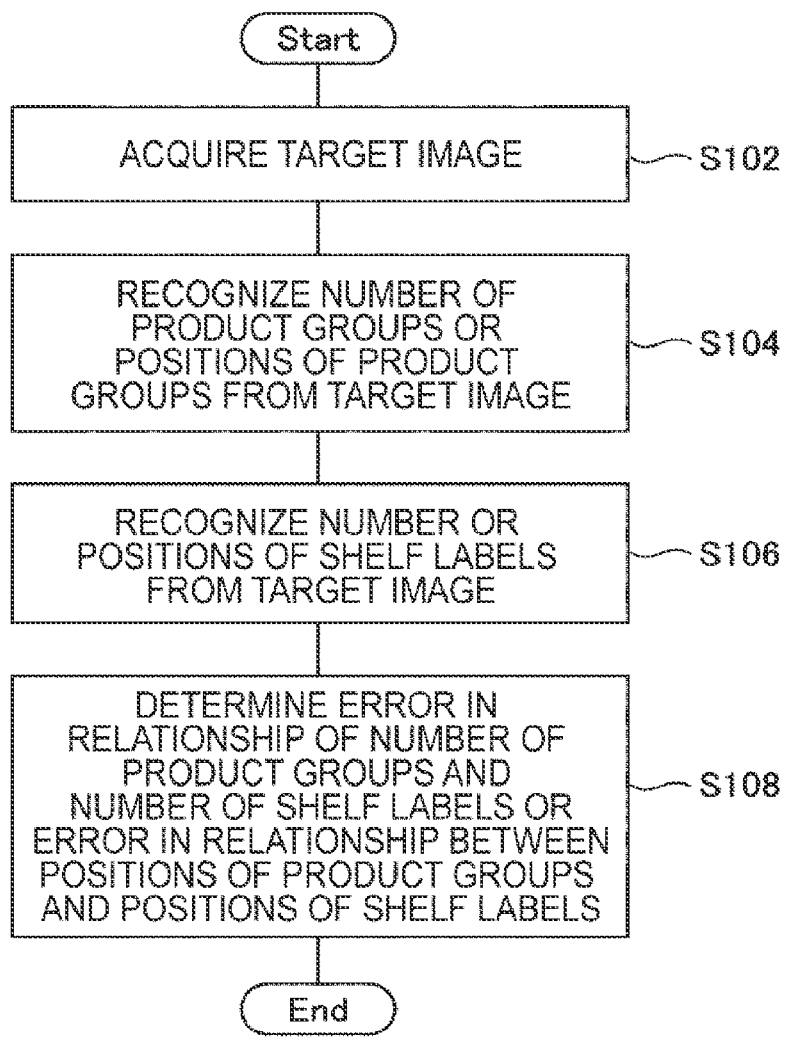
FIG. 2 is a flowchart illustrating a flow of processes performed by the information processing apparatus of Exemplary Embodiment 1.

FIG. 2 is a flowchart illustrating a flow of processes performed by the information processing apparatus 2000 of Exemplary Embodiment 1. The information processing apparatus 2000 acquires the target image (S102). The product recognition unit 2020 recognizes the number or positions of product groups from the target image (S104). The shelf label recognition unit 2040 recognizes the number or positions of shelf labels from the target image (S106). The determination unit 2060 determines an error in the relationship between the number of the recognized types of product groups and the number of shelf labels or the relationship between the position of the recognized product group and the position of the shelf label (S108).

According to the information processing apparatus 2000 of the present exemplary embodiment, an error is determined in the relationship between the number of product groups (the number of the types of products) and the number of shelf labels or in the relationship between the positions of the product groups (the positions of each type of products) and the positions of the shelf labels, by using the target image on which the products and the shelf labels are imaged. Thus, in a case where there is an error in the relationship between the number of product groups and the number of shelf labels or in the relationship between the position of the product group and the position of the shelf label, the salesperson can appropriately set the shelf label and the product group by correcting the number or position of the shelf labels or the product groups. Note that, concrete situations in which there is an error in the relationship between the number of product groups and the number of shelf labels or concrete situations in which there is an error in the relationship between the position of the product group and the position of the shelf label will be described below in conjunction with concrete examples.

Hereinafter, the information processing apparatus 2000 will be described in more detail.

<Hardware Configuration Example>

The respective functional components of the information processing apparatus 2000 may be realized by hardware that realizes each functional component (for example, a hard-wired electronic circuit), or may be realized by a combination of hardware and software (for example, a combination of an electronic circuit and a program that controls the electronic circuit). Hereinafter, in a case where each functional component is realized by the combination of hardware and software, the configuration thereof will be illustrated in detail.

The information processing apparatus 2000 may be realized by various types of computers, such as a portable terminal, a personal computer (PC), or a server. Here, the information processing apparatus 2000 may be realized by a dedicated computer for implementing the information processing apparatus 2000, or may be realized by a general-purpose computer that operates other applications.

Figure 3:
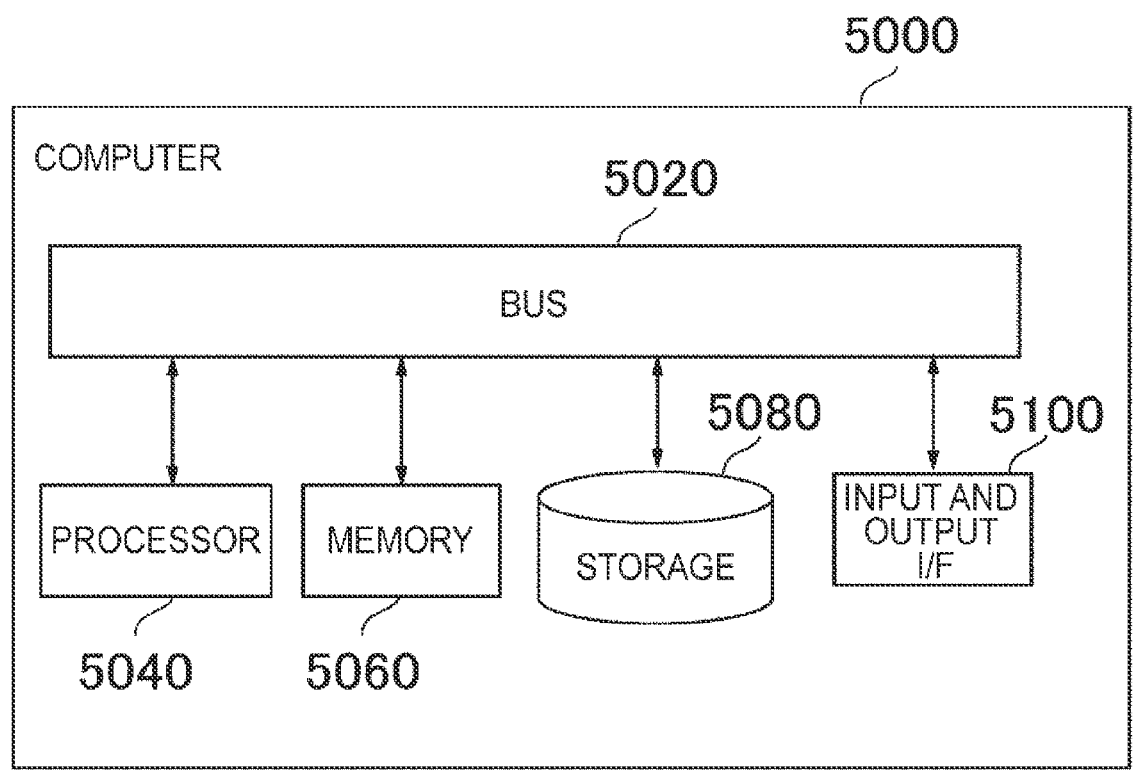
FIG. 3 is a block diagram illustrating a hardware configuration of a computer that realizes the information processing apparatus.

FIG. 3 is a block diagram illustrating a hardware configuration of a computer 5000 that realizes the information processing apparatus 2000. The computer 5000 includes a bus 5020, a processor 5040, a memory 5060, a storage 5080, and an input and output interface 5100. The bus 5020 is a data transmission path through which the processor 5040, the memory 5060, the storage 5080, and the input and output interface 5100 transmit and receive data to and from one another. Here, the method of connecting the processor 5040 and the like is not limited to bus connection. The processor 5040 is, for example, a processing device such as a central processing unit (CPU) or a graphics processing unit (GPU). The memory 5060 is, for example, a memory such as a random access memory (RAM) or a read only memory (ROM). The storage 5080 is, for example, a storage apparatus such as a hard disk, a solid state drive (SSD), or a memory card. The storage 5080 may be a memory such as RAM or ROM.

The input and output interface 5100 is an input and output interface through which the computer 5000 transmits and receives data to and from an external apparatus. For example, in a case where the information processing apparatus 2000 acquires the target image from the external apparatus, the computer 5000 that realizes the information processing apparatus 2000 is connected to the external apparatus through the input and output interface 5100. Note that, there are various methods of connecting the computer 5000 to the external apparatus through the input and output interface. For example, such connection is bus connection using a bus line (for example, universal serial bus (USB)) or network connection using a network line. Note that the network line may be a wireless line, or may be a wired line.

The storage 5080 stores a program for realizing the function of the information processing apparatus 2000. Specifically, program modules for respectively realizing the functions of the product recognition unit 2020, the shelf label recognition unit 2040, and the determination unit 2060 are stored. The processor 5040 realizes the functions of the product recognition unit 2020, the shelf label recognition unit 2040, and the determination unit 2060 by executing the respective program modules. Here, when the respective modules are executed, the processor 5040 may read these modules into the memory 5060 and may execute the read module, or may execute the module without reading the module into the memory 5060.

Note that, the hardware configuration of the computer 5000 used for realizing the information processing apparatus 2000 is not limited to the configuration illustrated in FIG. 3. For example, the respective program module may be stored in the memory 5060. In this case, the computer 5000 may not include the storage 5080.

<Acquisition Method of Target Image>

The target image is imaged by a camera provided in a store. Only one type of product or one shelf label may be pictured or a plurality of different products or a plurality of shelf labels may be pictured on one target image.

For example, the information processing apparatus 2000 acquires the target image stored within this camera. In a case where an external storage device is stored in the target image imaged by the camera, the information processing apparatus 2000 may acquire the target image from this storage device. The camera may be provided such that the imaged target image is stored in a storage device provided within the information processing apparatus 2000. In this case, the information processing apparatus 2000 acquires the target image from a storage unit provided within the information processing apparatus 2000.

The camera may be provided integrally with the computer that realizes the information processing apparatus 2000, or may be provided outside the computer. As an example in which the camera is provided integrally with the computer that realizes the information processing apparatus 2000, the information processing apparatus 2000 may be realized by a portable terminal equipped with the camera. In this case, the information processing apparatus 2000 performs a process on the target image imaged by the camera of the portable terminal.

<Details of Product Recognition Unit 2020>

The product recognition unit 2020 analyzes the target image, and recognizes a product. Here, a technique for recognizing an object such as a product pictured on an image is a well-known technique, and thus various well-known techniques may be used for recognizing the object. Hereinafter, an example of a process performed by the product recognition unit 2020 will be described.

Figure 4:
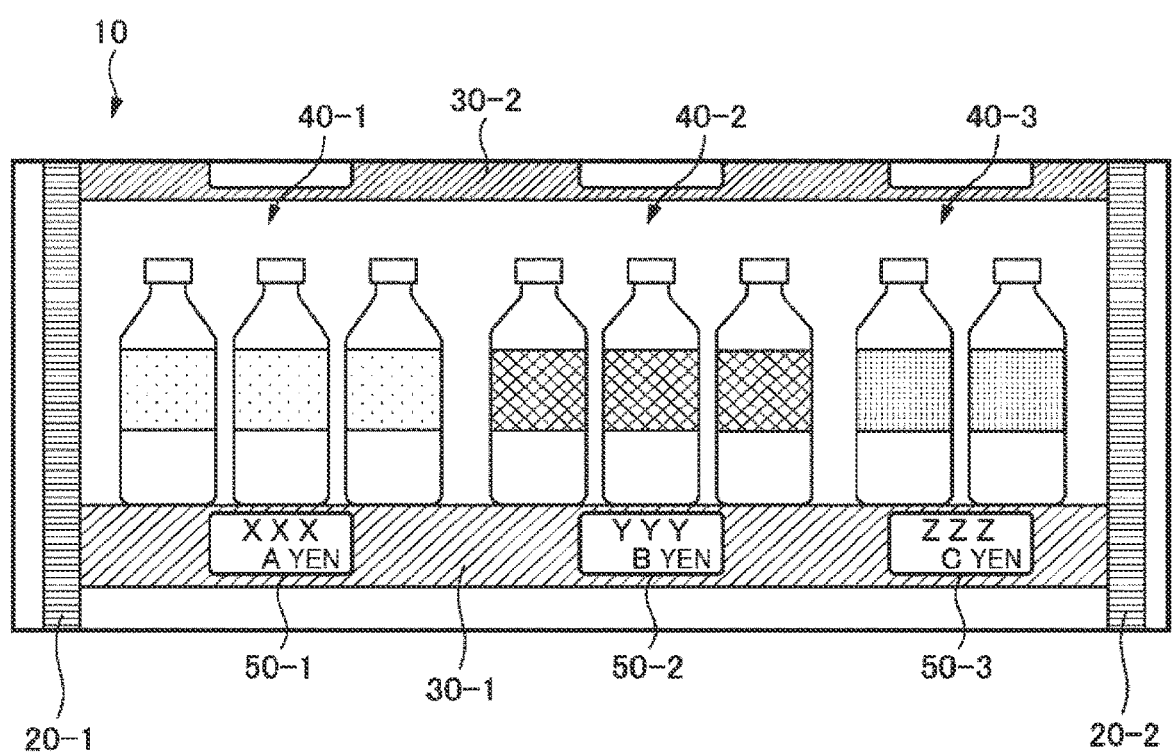
FIG. 4 is a diagram illustrating a target image.

FIG. 4 is a diagram illustrating the target image 10. A product shelving on which the products are exhibited is pictured on the target image 10. Note that, the way of exhibiting the products is not limited to exhibit the products on the product shelving, as long as the products and the shelf labels may be pictured on the target image.

An outer frame 20 is an outer frame of the product shelving. A shelf plate 30 is a plate on which the products are placed. A product group 40 represents a product group. Three product groups are pictured on the target image 10 of FIG. 4. A shelf label 50 is a label displaying information of the product. In FIG. 4, three shelf labels are pictured on the target image 10. Here, the shelf label 50 may be a shelf label created as an analog medium such as paper, or may be a shelf label created as an electronic medium.

Initially, the product recognition unit 2020 recognizes the product from the target image 10. The product recognition unit 2020 recognizes a group of products among the recognized products that are adjacent to each other and have similar feature values, as one product group 40. For example, the product group 40-1, the product group 40-2, and the product group 40-3 are recognized from the target image 10 in FIG. 4.

<<Method 1 of Recognizing Product Group 40>>

For example, the product recognition unit 2020 classifies the respective products into the product groups 40 by sequentially comparing the feature values of the adjacent products from any of the left and the right. Specifically, the product recognition unit 2020 classifies these products into the same product group 40 if the feature values of the adjacent products are the same as or similar to each other. On the other hand, the product recognition unit 2020 classifies these products into different product groups 40 if the feature values of the adjacent products are not similar to each other.

For example, in the example of FIG. 4, the product recognition unit 2020 sequentially compares the feature values of the respective products placed on a shelf plate 30-1 from the left. Initially, the product recognition unit 2020 determines that the feature values of the first product and the second product are similar to each other, and classifies the first product and the second product into the same product group 40-1. Similarly, the product recognition unit 2020 determines that the feature values of the second product and the third product are similar to each other, and also classifies the third product into the same product group 40-1. On the other hand, as a result acquired by comparing the feature values of the third product and the fourth product, the product recognition unit 2020 determines that these feature values are not similar. As a result, the fourth product is classified into the product group 40-2, which is a product group different from the product group 40-1.

According to this method, the product recognition unit 2020 does not need to recognize the feature values of the respective products in advance. Thus, it is possible to reduce computer resources required to realize the information processing apparatus 2000.

<<Method 2 of Recognizing Product Group 40>>

The product recognition unit 2020 may recognize the product group 40 by using information (hereinafter, referred to as product information) that is acquired by associating the product with a feature value describing a feature of the appearance of the product. The product information may be stored in the storage unit provided inside or outside the information processing apparatus 2000 in advance. The product recognition unit 2020 acquires the product information from the storage unit.

As for the product information, one or a plurality of feature values may be associated with one product. Here, in a case where the plurality of features is associated with one product, these feature values are, for example, feature values indicating the features of the product viewed in different directions. In some products, the appearance of the product looks very different depending on directions in which the product is viewed. For example, a certain product would have patterns on the label attached thereto that look very different between when being viewed in a certain direction and when being viewed in another direction. Since the exhibited products are not necessarily placed to face to the same direction, when the appearance of the product looks very different depending on the directions in which the product is viewed, the feature values of the product extracted from the target image may be different even though the same product is viewed.

Thus, the product recognition unit 2020 determines the product corresponding to the calculated feature values, by comparing the feature values calculated from the target image 10 with the feature value indicated by the product information. The product recognition unit 2020 classifies the products that are the same product as each other and are adjacent to each other into the same product group 40.

According to this method, the same type of products (products placed in different directions), the feature values calculated from the target image of which are not similar to each other, are classified into the same product group 40. Thus, it is possible to increase the accuracy of the classification of the product group 40.

<<Method of Recognizing Number of Product Group 40>>

The product recognition unit 2020 recognizes the number of the product group 40 by counting the number of recognized product groups 40.

<<Method of Recognizing Position of Product Group 40>>

For example, the product recognition unit 2020 recognizes a coordinate of each product group 40 on the target image 10, as the position of the product group 40. Here, the coordinate of the product group 40 is a coordinate satisfying a predetermined condition within an area indicating the product group 40. For example, this condition is a center, a left end, or a right end of the area indicating the product group 40. Note that, the product recognition unit 2020 may represent the position of the product group 40 as a two-dimensional coordinate (a combination of a horizontal direction with a vertical direction), or may represent the position thereof as a one-dimensional coordinate (a coordinate in the horizontal direction).

<Details of Shelf Label Recognition Unit 2040>

The shelf label recognition unit 2040 analyzes a target image, and recognizes a shelf label. Here, similarly to the product recognition unit 2020, the shelf label recognition unit 2040 can use various existing techniques for recognizing an object from the image. Hereinafter, an example of a process performed by the shelf label recognition unit 2040 will be described.

<<Recognition Method of Shelf Label 50>>

Similarly to the case of the product recognition unit 2020, the recognition method of the shelf label will be described with reference to FIG. 4. For example, the shelf label recognition unit 2040 recognizes the shelf label 50 by acquiring information indicating a feature value of the shelf label 50 and recognizing an object matching this feature value from the target image. Here, the feature value of the shelf label 50 may be stored in the storage unit provided inside or outside the information processing apparatus 2000 in advance.

For example, the shelf label recognition unit 2040 may recognize the area indicating the shelf plate 30, and then recognize as the shelf label 50 an object having a predetermined shape (a rectangle or the like) included in this area indicating the shelf plate 30. For example, the shelf label recognition unit 2040 recognizes the shelf plate 30 by acquiring the feature value indicating the shelf plate 30 and using the acquired feature value. Here, the feature value of the shelf plate 30 or the predetermined shape indicating the shelf label 50 may be stored in the storage unit provided inside or outside the information processing apparatus 2000 in advance.

<<Method of Recognizing Number of Shelf Label>

The shelf label recognition unit 2040 recognizes the number of shelf labels 50 by counting the number of shelf labels 50 recognized by the aforementioned method.

<<Method of Recognizing Position of Shelf Label>

The method of causing the shelf label recognition unit 2040 to recognize the position of the shelf label 50 is the same as the method of causing the product recognition unit 2020 to recognize the position of the product group 40.

<Details of Determination Unit 2060>

As stated above, the determination unit 2060 determines an error in the relationship between the number of recognized product groups 40 and the number of shelf labels 50, or the relationship between the position of the product group 40 and the position of the shelf label 50.

<<Determination Method of Number Relationship>>

The determination unit 2060 compares the number of product groups 40 with the number of shelf labels 50. For example, the determination unit 2060 determines that there is an error in the relationship between the numbers if the number of product groups 40 and the number of shelf labels 50 are different.

The determination method will be described in detail with reference to FIGS. 4 to 6. In the aforementioned example of FIG. 4, the number of product groups 40 is 3, and the number of shelf labels 50 is 3. Thus, the determination unit 2060 determines that the relationship between the number of product groups 40 and the number of the shelf labels 50 is correct.

Figure 5:
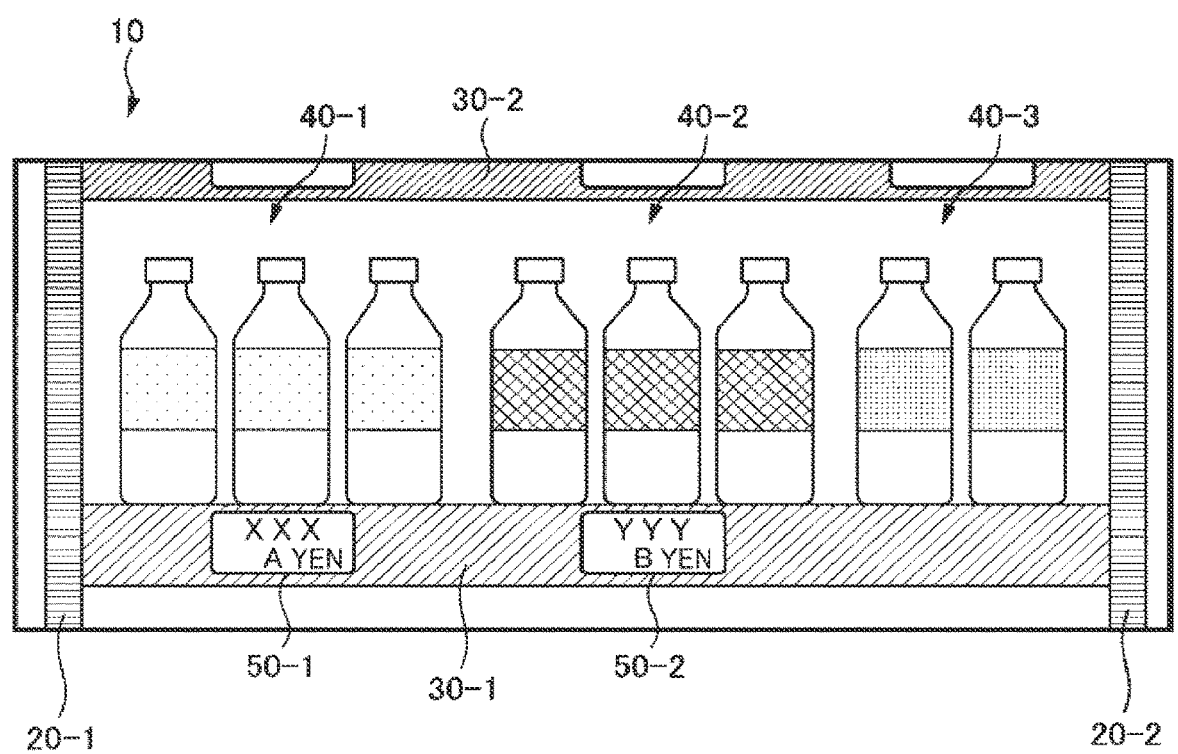
FIG. 5 is a first diagram illustrating a target image representing a case where the number relationship is incorrect.

FIG. 5 is a first diagram illustrating the target image representing a case where the number relationship is incorrect. In the aforementioned example of FIG. 5, the number of product groups 40 is 3, whereas the number of shelf labels 50 is 2. Thus, the determination unit 2060 determines that there is an error in the relationship between the number of product groups 40 and the number of shelf labels 50. For example, the situation illustrated by FIG. 5 may occur when the salesperson forgets an operation of adding a shelf label 50-3 even though the product in the product group 40-3 is newly exhibited or when the shelf label 50-3 falls off. The salesperson can recognize that such a situation occurs, by using the result of the determination performed by the determination unit 2060.

Figure 6:
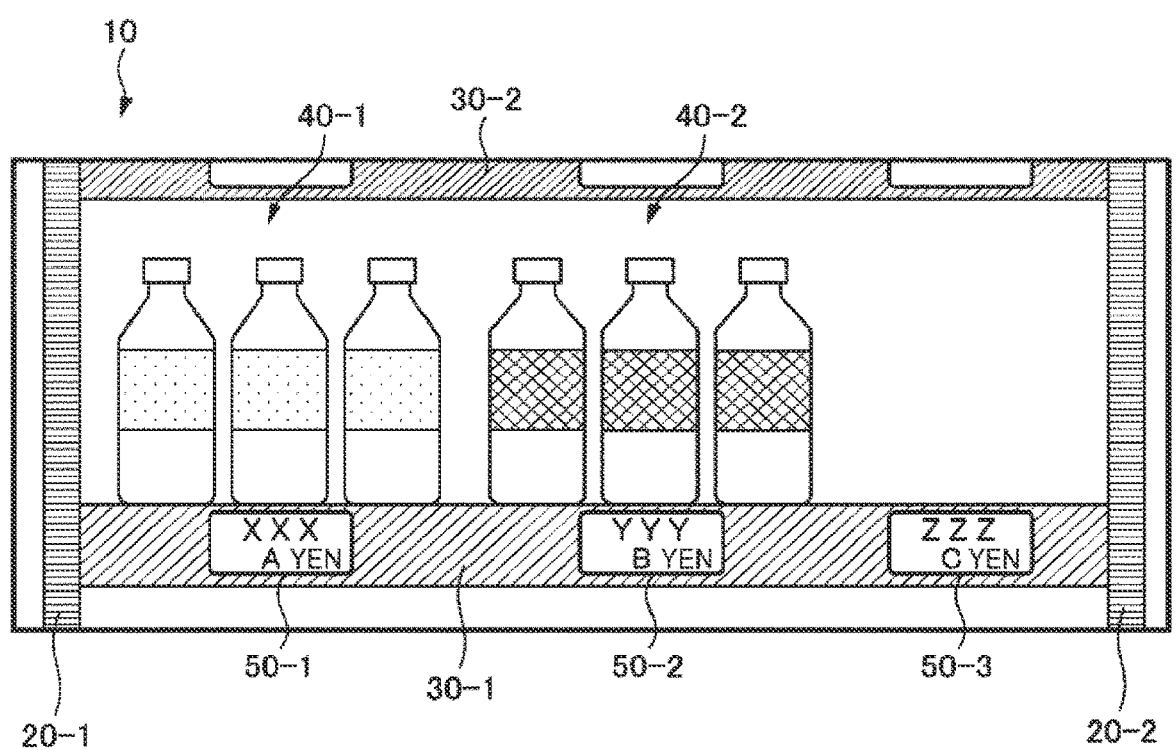
FIG. 6 is a second diagram illustrating the target image representing a case where the number relationship is incorrect.

FIG. 6 is a second diagram illustrating the target image representing a case where the number relationship is incorrect. In the example of FIG. 6, the number of product groups 40 is 2, whereas the number of shelf labels 50 is 3. In this case, the determination unit 2060 determines that there is an error in the relationship between the number of product groups 40 and the number of shelf labels 50. For example, the situation illustrated by FIG. 6 may occur when the salesperson forgets removing the shelf label 50-3 even though the exhibition of the product of the product group 40-3 is terminated, when the salesperson forgets adding the product even though the shelf label 50-3 is added in order to newly exhibit the product of the product group 40-3, or the product of the product group 40-3 is sold out. The determination result performed by the determination unit 2060 is used, and thus, the salesperson can recognize that such a status occurs.

<<Determination Method of Positional Relationship>>

For example, if there is not the shelf label 50 in a predetermined direction to the product group 40, the determination unit 2060 determines that there is an error in the relationship between the position of the product group 40 and the position of the shelf label 50. For example, the predetermined direction is up, down, left, or right.

Here, as described above, suppose that information indicating a direction in which the shelf label 50 is attached for the product group 40 is previously stored in the storage unit inside or outside the information processing apparatus 2000. For example, in a case where the shelf label 50 is attached above the product group 40, if there is no shelf label 50 above the product group 40, the determination unit 2060 determines that there is an error in the relationship between the position of the product group 40 and the position of the shelf label 50.

The process performed by the determination unit 2060 will be described in detail with reference to FIGS. 4 and 7. In these diagrams, it is assumed that the shelf label 50 is attached under the product group 40.

In FIG. 4, a shelf label 50-1 is located under the product group 40-1, a shelf label 50-2 is located under the product group 40-2, and a shelf label 50-3 is located under the product group 40-3. Thus, the determination unit 2060 determines that the relationship between the position of product groups 40 and the position of the shelf labels 50 is correct.

Figure 7:
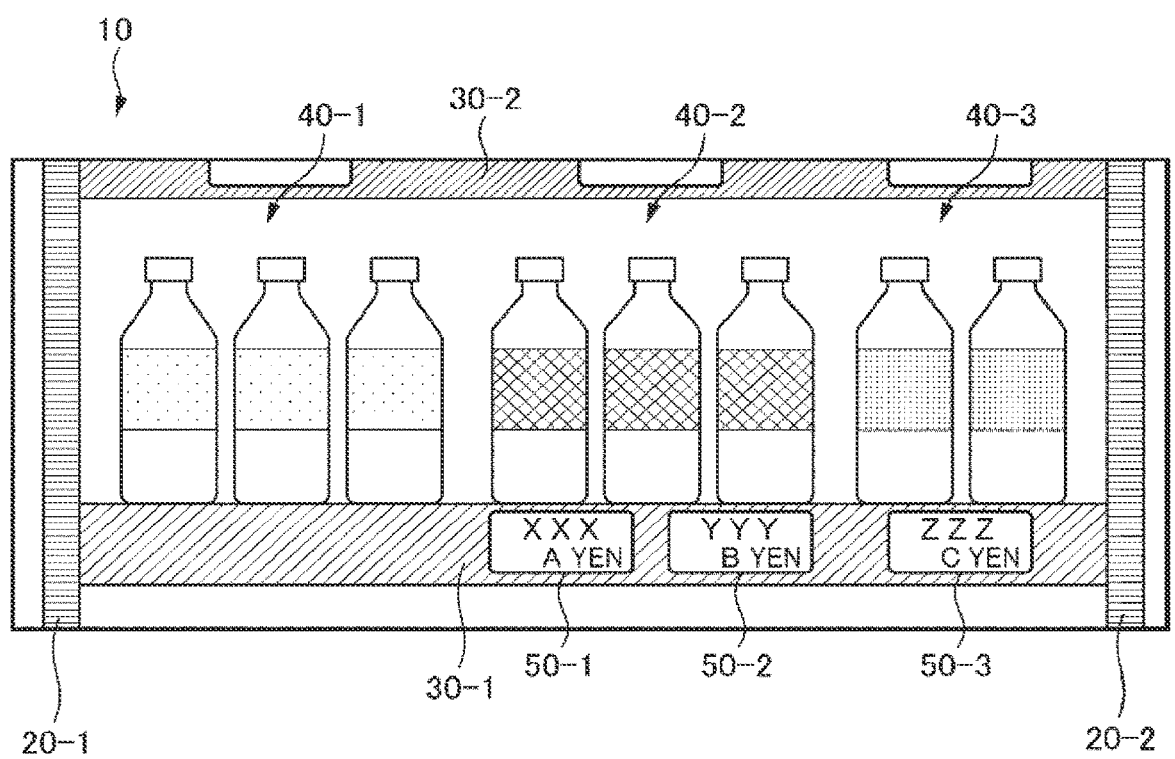
FIG. 7 is a diagram illustrating a target image representing a case where the positional relationship is incorrect.

FIG. 7 is a diagram illustrating a target image representing a case where the positional relationship is incorrect. In FIG. 7, the shelf label 50 is not located under the product group 40-1. Thus, the determination unit 2060 determines that there is an error in the relationship between the position of product groups 40 and the position of shelf labels 50.

Figure 8:
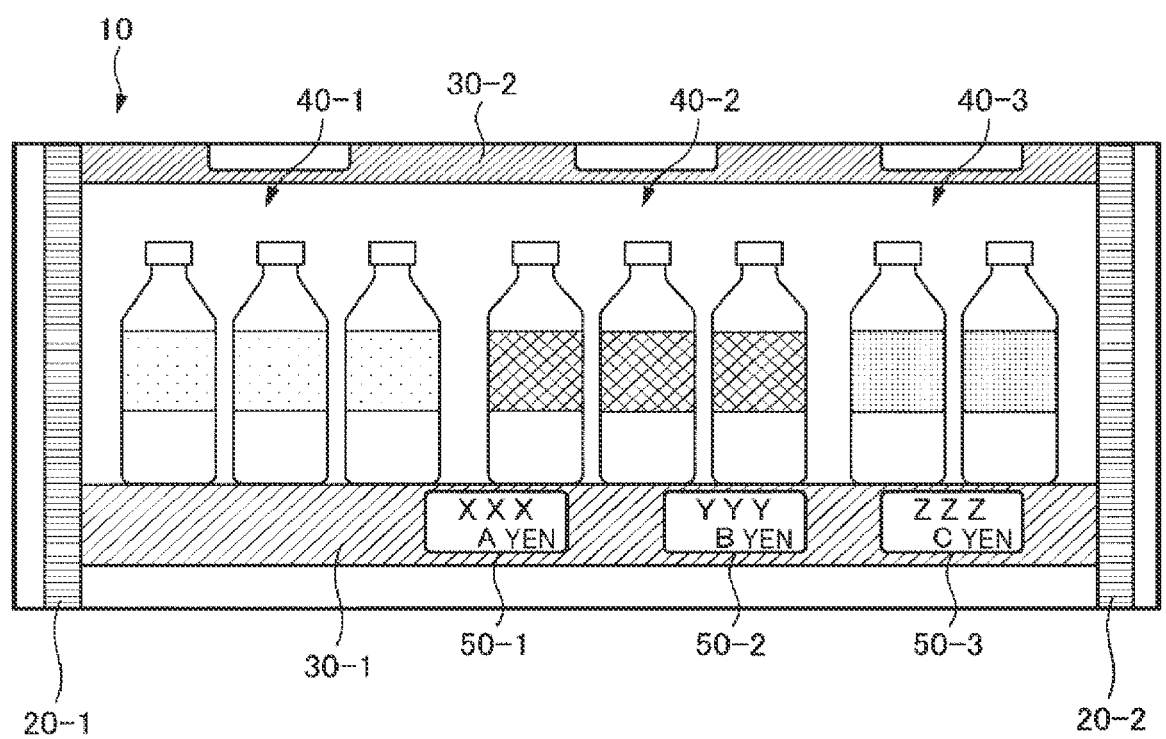
FIG. 8 is a diagram illustrating a target image representing a case where a shelf label is positioned in a boundary between two product groups.

Here, there would be a case in which the shelf label is positioned in a boundary between two product groups, and the same shelf label is positioned under the two product groups. FIG. 8 is a diagram illustrating a target image representing a case where a shelf label is positioned in a boundary between two product groups. In FIG. 8, the shelf label 50 is positioned in a boundary between two product groups 40-1 and 40-2. The determination unit 2060 needs to determine under which product group the shelf label is located.

In such a case, the determination result performed by the determination unit 2060 could be different based on under which product group 40 the shelf label 50 is determined to be located. If it is determined that the shelf label 50 is located under the product group 40-1, the shelf label 50 is attached under each product group 40. Thus, the determination unit 2060 determines that the relationship between the position of product groups 40 and the position of the shelf labels 50 is correct. On the other hand, if it is determined that the shelf label 50 is located under the product group 40-2, there is no shelf label 50 under the product group 40-1. Thus, the determination unit 2060 determines that there is an error in the relationship between the position of product groups 40 and the position of shelf labels 50.

Figure 9:
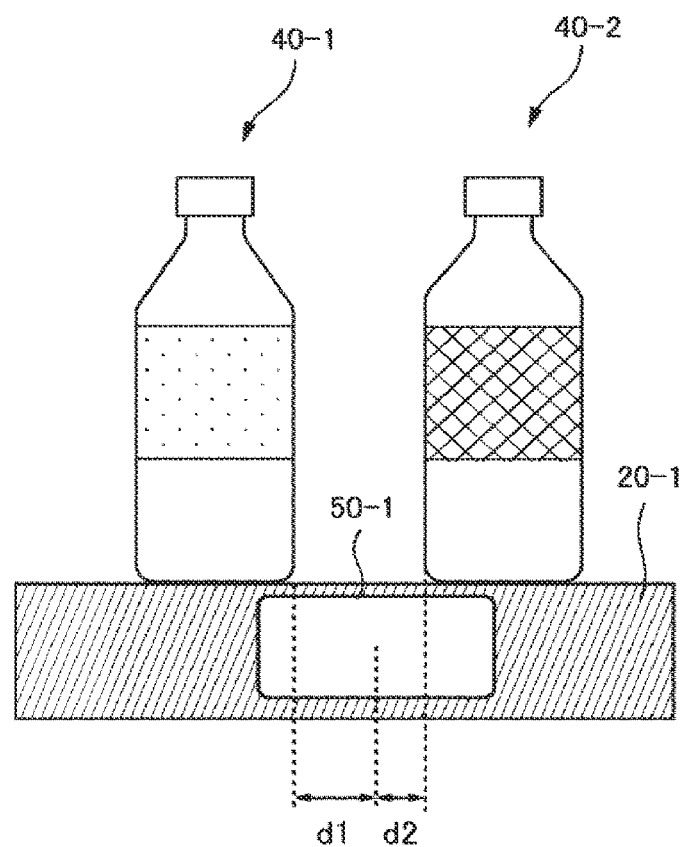
FIG. 9 is a diagram illustrating a zoomed area near the boundary between the product groups of FIG. 8.

For example, when there is the shelf label 50 in the boundary between two product groups 40 as stated above, the determination unit 2060 determines that the shelf label 50 is located under the closer product group 40. The determination method will be described in detail with reference to FIG. 9. FIG. 9 is a diagram illustrated by zooming an area near the boundary between the product group 40-1 and the product group 40-2 of FIG. 8. In order to easily view the diagram, the described content of the shelf label 50-1 will not be repeated. In FIG. 9, a horizontal distance between the right end of the product group 40-1 and the center of the shelf label 50-1 is d1. In FIG. 9, a horizontal distance between the left end of the product group 40-2 and the center of the shelf label 50-1 is d2. Here, since d2 is less than d1, the product group 40-2 is located closer to the shelf label 50-1 than the product group 40-1 is. Thus, the determination unit 2060 determines that the shelf label 50-1 is located under the product group 40-2.

As a result, in the example of FIG. 8, there is no shelf label 50 under the product group 40-1. Thus, the determination unit 2060 determines that there is an error in the relationship between the position of product groups 40 and the position of shelf labels 50.

Note that, in a case where a plurality of rows of the product shelving is pictured on the target image, the determination unit 2060 may take into consideration which product group 40 and which shelf label 50 are included in the same row. Specifically, the determination unit 2060 limits the target of the determination of whether or not there is an error in the positional relationship or the number relationship to the products and the shelf labels included in the same row.

Although it has been described in FIG. 4 that the product group 40 corresponding to the shelf label 50 is placed above the shelf label 50, an exhibition method of placing the product group 40 corresponding to the shelf label 50 under this shelf label 50 is also used. That is, a certain row of the product shelving becomes 1) an area including the shelf plate 30 and the product group 40 placed on the shelf plate 30 or 2) an area including the shelf plate 30 and the product group 40 placed under the shelf plate 30. Whether the determination unit 2060 recognizes 1) or 2) as the row is set in advance. For example, information for determining whether the determination unit recognizes 1) or 2) as the row (information indicating whether the shelf label 50 is attached above or under the product group 40) is stored in advance in the storage unit provided inside or outside the information processing apparatus 2000. The product recognition unit 2020 determines an area recognized as one row by referring to this information. The product recognition unit 2020 determines the relationship between the product group 40 and the shelf label 50 included in the same row.

The determination unit 2060 may determine that there is an error in the relationship between the position of the product group 40 and the position of the shelf label 50 in a case where there is no shelf label 50 within a predetermined distance range from a certain product group 40. In this case, it is assumed that the predetermined distance is stored in the storage unit outside or inside the information processing apparatus 2000. The determination unit 2060 may take both the direction and the distance into consideration. Specifically, the determination unit 2060 determines that there is an error in the positional relationship between the product group 40 and the shelf label 50 in a case where there is no shelf label 50 that satisfies the condition in which "a certain product group 40 is located in a predetermined direction with respect to the product group 40 and a distance from the product group 40 is equal to or less than a predetermined distance".

<Determination Method of Focusing on Both Number Relationship and Positional Relationship>

The determination unit 2060 may determine an error in the relationship between the product group 40 and the shelf label 50 by focusing on both the number relationship and the positional relationship. The determination method will be described in detail with reference to FIG. 5. In the situation of FIG. 5, if the determination unit 2060 determines an error in the relationship between the position of the product group 40 and the position of the shelf label 50, it is determined that there is an error in the positional relationship. The shelf label 50 is not located under the product group 40-3. However, in some points of view, the situation of FIG. 5 may mean that "there is no error in the positional relationship and there is an error in the number relationship".

Figure 10:
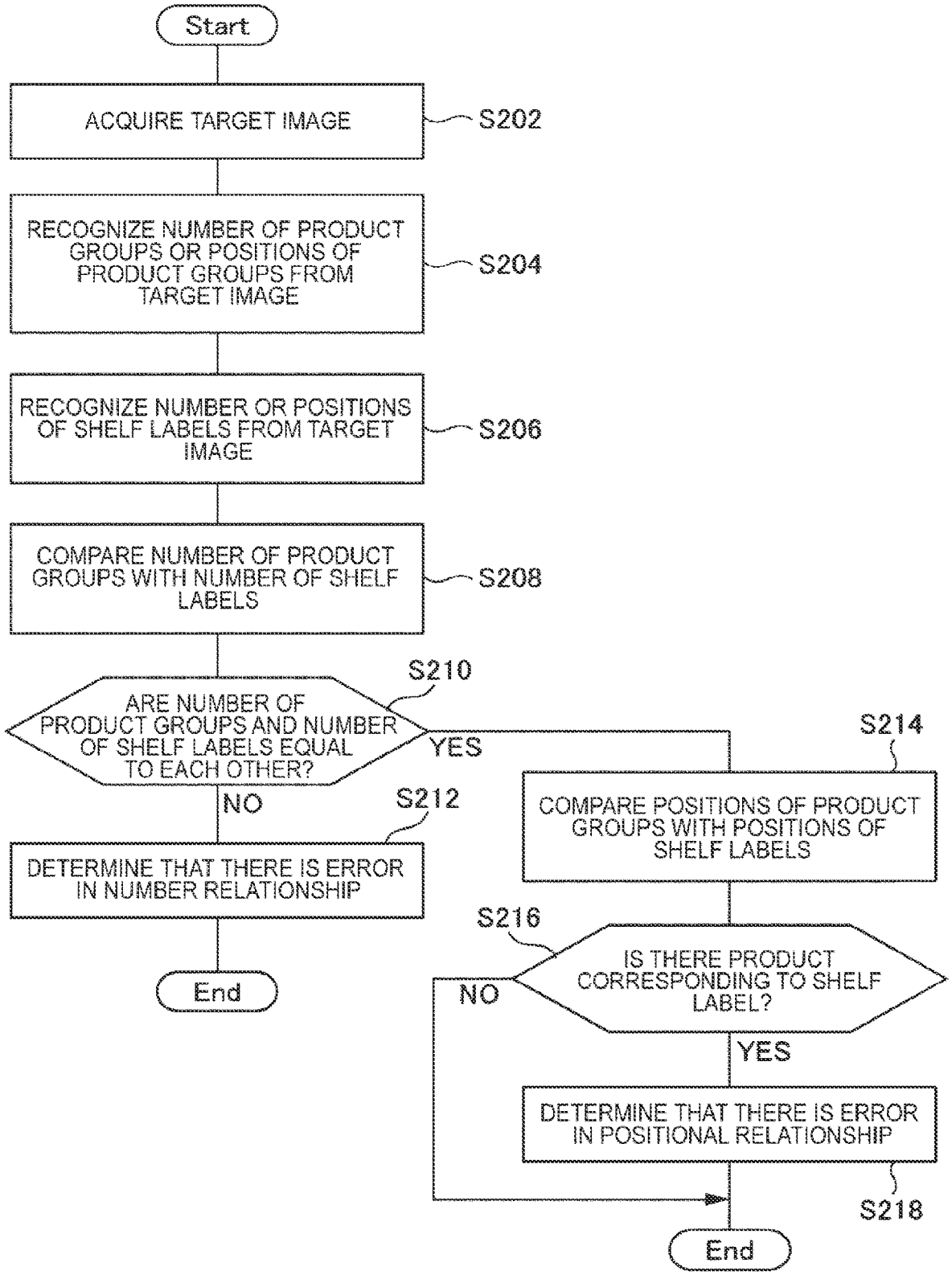
FIG. 10 is a flowchart illustrating a flow of processes performed by the information processing apparatus of Exemplary Embodiment 1 in which both the number relationship and the positional relationship are used.

Thus, the determination unit 2060 may determine whether or not there is an error in the relationship between the position of the product group 40 and the position of the shelf label 50, only when the relationship between the number of product groups 40 and the number of shelf labels 50 is correct. A flowchart for illustrating a flow of processes is illustrated in FIG. 10.

The information processing apparatus 2000 acquires the target image (S202). The product recognition unit 2020 recognizes the number or positions of product groups 40 from the target image (S204). The shelf label recognition unit 2040 recognizes the number or positions of shelf labels 50 from the target image (S206). The determination unit 2060 compares the number of product groups 40 with the number of shelf labels 50 (S208).

In a case where the number of product groups 40 and the number of shelf labels 50 are not equal to each other (S210: NO), the process of FIG. 10 proceeds to step S212. In step S212, the determination unit 2060 determines that there is an error in the number relationship between the product groups 40 and the shelf labels 50.

On the other hand, in a case where the number of product groups 40 and the number of shelf labels 50 are equal to each other (S210: YES), the process of FIG. 10 proceeds to step S214. In step S214, the determination unit 2060 compares the position of the product groups 40 with the position of the shelf labels 50. In a case where there is a product group 40 that has no corresponding shelf label 50 (S216: YES), the process of FIG. 10 proceeds to step S218. In step S218, the determination unit 2060 determines that there is an error in the positional relationship between the product groups 40 and the shelf labels 50. On the other hand, in a case where there is no product group 40 that has no corresponding shelf label 50 (S216: NO), the process of FIG. 10 is ended.

The determination is performed using both the number relationship and the positional relationship as stated above, and the determination result performed by the determination unit 2060 becomes more accurate.

<Timing when Information Processing Apparatus 2000 Performs Processes>

There are various timings when the information processing apparatus 2000 performs the processes. For example, the information processing apparatus 2000 periodically performs the processes. In this case, a date and time or a cycle in which the process is performed is set in advance for the information processing apparatus 2000. For example, the information processing apparatus 2000 may perform the process when the operation by the salesperson is received. The information processing apparatus 2000 may perform the process when the target image is generated or when the target image is acquired.

Exemplary Embodiment 2

Figure 11:
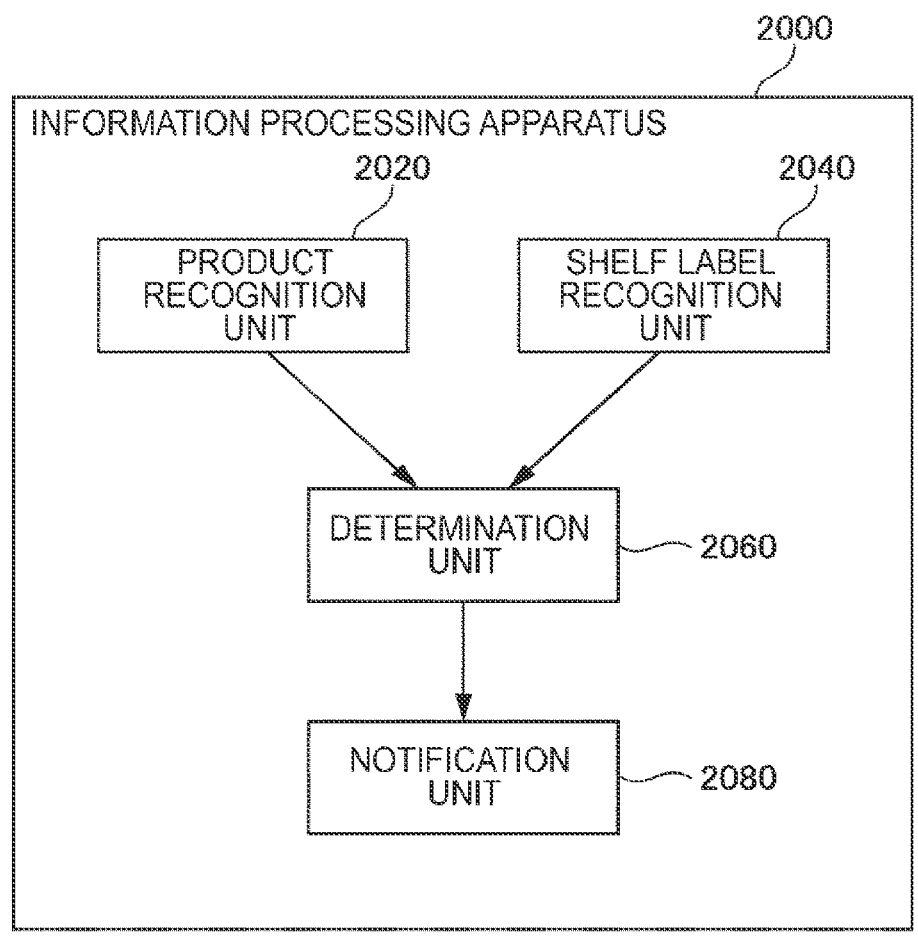
FIG. 11 is a block diagram illustrating an information processing apparatus according to Exemplary Embodiment 2.

FIG. 11 is a block diagram illustrating an information processing apparatus 2000 according to Exemplary Embodiment 2. In FIG. 11, arrows represent information flows. In FIG. 11, each block does not represent a configuration of a hardware unit but a configuration of a functional unit.

The information processing apparatus 2000 of Exemplary Embodiment 2 includes a notification unit 2080. The notification unit 2080 performs the notification or the displaying in a case where it is determined that there is an error by the determination unit 2060. By performing the notification or the displaying as stated above, the salesperson can easily recognize the determination result performed by the determination unit 2060.

<Flow of Processes>

Figure 12:
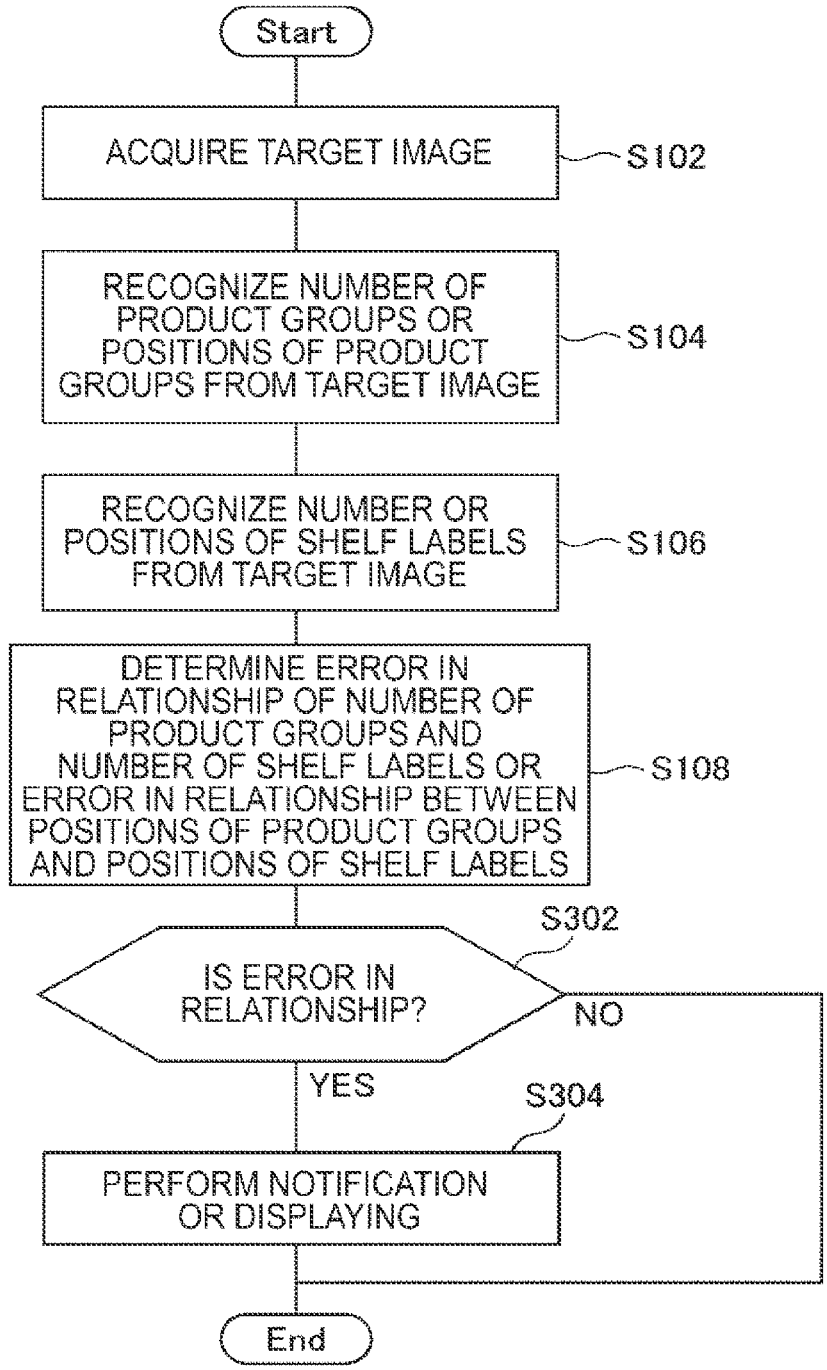
FIG. 12 is a flowchart illustrating a flow of processes performed by the information processing apparatus of Exemplary Embodiment 2.

FIG. 12 is a flowchart illustrating a flow of processes performed by the information processing apparatus 2000 of Exemplary Embodiment 2. Here, steps S102 to S108 are the same as those of the flowchart of FIG. 2, and thus, the description thereof will not be repeated. The process of FIG. 12 is branched at step S302. Specifically, in a case where it is determined that there is no error in the number or positional relationship between the product groups 40 and the shelf labels 50 in step S108 (step S302: NO), the process of FIG. 12 is ended. On the other hand, in a case where it is determined that there is the error in the number or positional relationship between the product groups 40 and the shelf labels 50 in step S108 (step S302: YES), the process of FIG. 12 proceeds to step S304. In step S304, the notification unit 2080 performs the notification or displaying indicating that there is the error in the number or positional relationship between the product groups 40 and the shelf labels 50.

<About Target Terminal of Notification or Display>

The salesperson present in a store into which the information processing apparatus 2000 is introduced may directly use the information processing apparatus 2000 or may use another terminal (hereinafter, referred to as a user terminal) connected to the information processing apparatus 2000 in a communicatable fashion. For example, the user terminal is a portable terminal carried by each salesperson.

For example, in a case where the salesperson directly uses the information processing apparatus 2000, when the determination unit 2060 determines that there is the error in the number or positional relationship between the product groups 40 and the shelf labels 50, the notification unit 2080 displays the notification indicating that there is the error, on the display screen connected to the information processing apparatus 2000. Meanwhile, in a case where the salesperson uses the user terminal, when it is determined that there is the error in the number or positional relationship between the product groups 40 and the shelf labels 50, the information processing apparatus 2000 notifies the user terminal of the determination result performed by the determination unit 2060. The user terminal that receives this notification displays the determination result on the display screen included in the user terminal. Here, the notification unit 2080 may perform both the displaying on the information processing apparatus 2000 and the notification to the user terminal.

Here, the process performed by the information processing apparatus 2000 or the user terminal in a case where it is determined that there is the error in the number or positional relationship between the product groups 40 and the shelf labels 50 is not limited to the output to the display screen. For example, the information processing apparatus 2000 or the user terminal may output voice for reporting that it is determined that there is the error, or may perform a process of turning on the light.

<Notification Method of Error Content>

The notification unit 2080 may notify of or display the "notification indicating that there is the error" or may notify of or display the "notification indicating the kind of the error". For example, the notification unit 2080 notifies of information for determining a location (product shelving or row) in which it is determined that there is the error. Accordingly, the salesperson can easily recognize a location in which it is necessary to add or remove the products or the shelf labels. Note that, the notification unit 2080 performs the displaying on the display screen by the same method as various notification methods to be described below.

<<Notification Method of Target Location>>

For example, the notification unit 2080 performs notification including the target image on which a target location of notification (location in which the error is found in the relationship between the product groups 40 and the shelf labels 50) is pictured. Here, in a case where a plurality of locations (product shelving) in which the products are exhibited is pictured on the target image, the notification unit 2080 may attach the image on which the target location is highlighted or may attach the image on which only the target location is cropped.

For example, the notification unit 2080 may determine the location as the notification target, and may notify information related to this location. For example, this information is an ID of the product shelving or a position within the store.

In a case where the ID of the product shelving is displayed on the product shelving, the notification unit 2080 recognizes the ID of the product shelving as the notification target that is pictured on the target image. The notification unit 2080 notifies of the recognized ID of the product shelving. The notification unit 2080 may determine the position of the product shelving within the store by using the ID of the product shelving, and may notify of this position. In this case, the storage unit inside or outside the information processing apparatus 2000 stores information that associates the ID of the product shelving with the position of the product shelving within the store that has this ID (hereinafter, product shelving information).

The notification unit 2080 may determine the position of the product shelving within the store as the notification target and may notify of this position by using information related to the arrangement of the product shelving (store map) and information related to the imaging range of the camera with which the target image is imaged. Here, the information related to the imaging range of the camera that images the target image may be acquired from the camera, or may be acquired from the storage unit that stores the information related to the camera. Here, the notification unit 2080 may determine the ID of the product shelving from the position of the product shelving within the store as the notification target within the store and may notify of this ID by further using the aforementioned product shelving information.

The notification unit 2080 may notify of the information related to the row (row in which the error is found in the relationship between the product groups 40 and the shelf labels 50) as the notification target by the same method as the method of notifying of the information related to the aforementioned product shelving.

<Notification Method of Product Group 40 being Notification Target>

For example, in a case where there is no shelf label 50 above or under the product group 40, the notification unit 2080 preferably notifies that there is no shelf label 50 corresponding to the product group 40. Here, there are various methods of notifying of the product group 40 as this notification target. For example, the notification unit 2080 may perform the notification including the image on which the product group 40 of the notification target is highlighted or the image on which only the product group 40 as the notification target is cropped from the target image.

For example, the notification unit 2080 determines the product group 40 as the notification target by using the aforementioned product information (information in which the product is associated with the feature value indicating the appearance feature of the product). Here, the feature value of the product of each product group 40 is already calculated by the product recognition unit 2020. Thus, the notification unit 2080 determines the product corresponding to the feature value of the product of the product group 40 as the notification target by using the product information. For example, the notification unit 2080 notifies of the ID of the determined product group 40.

An ID for identifying the product may be assigned to the product. This ID may be represented by the character string such as alphabetical or alphanumeric characters, or may be represented by an image such as barcode or two-dimensional code. This ID is identified by the product recognition unit 2020. In this case, the notification unit 2080 notifies of the ID of the product of the notification target.

<<Determination Method of Shelf Label 50 of Notification Target>>

For example, in a case where there is no product group 40 above or under the shelf label 50, the notification unit 2080 preferably notifies that there is no product corresponding to the shelf label 50. For example, the notification unit 2080 may perform the notification including the image on which the shelf label 50 of the notification target is highlighted or the image on which only the shelf label 50 of the notification target is cropped from the target image.

The ID may be assigned to the shelf label by the same method as the aforementioned method for assigning the ID to the product. This ID is identified by the shelf label recognition unit 2040. In this case, the notification unit 2080 notifies of the ID of the shelf label of the notification target.

<Notification Indicating that there is No Error>

In a case where it is determined that there is no error in the relationship between the product groups 40 and the shelf labels 50, the notification unit 2080 may notify or display that there is no error. In a case where it is determined that there is no error, the notification unit 2080 may notify of or display the information related to the location, the product group or the shelf label in which it is determined that there is no error.

Although the exemplary embodiments of the present invention have been described with reference to the drawings, these exemplary embodiments are examples of the present invention, and the combinations of the exemplary embodiments and various configurations other than the exemplary embodiments may be adopted.

Hereinafter, reference examples are appended.

1. An information processing apparatus including:
   a product recognition unit recognizing a number of types of products or positions of each type of products from an image on which the products and shelf labels are imaged;
   a shelf label recognition unit recognizing a number or positions of shelf labels indicating information of the products from the image; and
   a determination unit determining whether or not there is an error in a relationship between the recognized number of types of products and the recognized number of shelf labels or in a relationship between the recognized positions of each type of products and the recognized positions of the shelf labels.

2. The information processing apparatus according to 1, wherein, in a case where the recognized number of types of products and the recognized number of shelf labels are not equal to each other, the determination unit determines that there is an error in the relationship between the recognized number of types of products and the recognized number of shelf labels.

3. The information processing apparatus according to 1 or 2,
   wherein, in a case where the shelf label is not attached for a predetermined type of products in a predetermined direction, the determination unit determines that there is an error in the relationship between the recognized positions of each type of products and the recognized positions of the shelf labels.

4. The information processing apparatus according to any one of 1 to 3,
   wherein, in a case where the shelf label is not attached within a predetermined distance range from a predetermined type of products, the determination unit determines that there is an error in the relationship between the recognized positions of each type of products and the recognized positions of the shelf labels.

5. The information processing apparatus according to any one of 1 to 4,
   wherein, in a case where it is determined that there is an error in the relationship between the recognized number of types of products and the recognized number of shelf labels, the determination unit determines whether or not there is an error in the relationship between the recognized positions of each type of products and the recognized positions of the shelf labels.

6. The information processing apparatus according to any one of 1 to 5, further including:
   a notification unit performing notification or displaying in a case where the determination unit determines that there is an error in the relationship between the recognized number of types of products and the number of shelf labels or in the relationship between the recognized positions of each type of products and the recognized positions of the shelf labels.

7. A control method performed by a computer, the method including:
   a product recognition step of recognizing a number of types of products or positions of each type of products from an image on which the products and shelf labels are imaged;
   a shelf label recognition step of recognizing a number or positions of shelf labels indicating information of each product from the image; and
   a determination step of determining whether or not there is an error in a relationship between the recognized number of types of products and the recognized number of shelf labels or in a relationship between the recognized positions of each type of products and the recognized positions of the shelf labels.

8. The control method according to 7,
   wherein, in a case where the recognized number of types of products and the recognized number of shelf labels are not equal to each other, it is determined that there is an error in the relationship between the recognized number of types of products and the recognized number of shelf labels in the determination step.

9. The control method according to 7 or 8,
   wherein, in a case where the shelf label is not attached for a predetermined type of products in a predetermined direction, it is determined that there is an error in the relationship between the recognized positions of each type of products and the recognized positions of the shelf labels in the determination step.

10. The control method according to any one of 7 to 9,
    wherein, in a case where the shelf label is not attached within a predetermined distance range from a predetermined type of products, it is determined that there is an error in the relationship between the recognized positions of each type of products and the recognized positions of the shelf labels in the determination step.

11. The control method according to any one of 7 to 10,
    wherein, in a case where it is determined that there is an error in the relationship between the recognized number of types of products and the recognized number of shelf labels, it is determined whether or not there is an error in the relationship between the recognized positions of each type of products and the recognized positions of the shelf labels in the determination step.

12. The control method according to any one of 7 to 11, further including:
    a notification step of performing notification or displaying in a case where it is determined that there is an error in the relationship between the recognized number of types of products and the number of shelf labels or in the relationship between the recognized positions of each type of products and the recognized positions of the shelf labels in the determination step.

13. A program causing a computer to operate as the information processing apparatus according to any one of claims 1 to 6.

The present application claims priority based on Japanese Patent Application No. 2014-201363 filed on Sep. 30, 2014, and the entire content thereof is incorporated by reference in the present application.

The invention claimed is:

1. An electronic shelf label error detection apparatus comprising:
   at least one memory configured to store instructions; and
   at least one processor configured to execute the instructions to:
   receive an image captured by a camera;
   recognize a position of a product from the image in which products and a shelf label are imaged;
   recognize a position of the shelf label indicating information of the product from the image;
   detect an error in a relationship between the recognized position of the product and the recognized position of the shelf label based on a determination that the shelf label is outside a first distance from the recognized position of the product; and control a display monitor to display the image in which a location including the position of the product related to the detected error is distinguishably displayed.

2. The electronic shelf label error detection apparatus according to claim 1,
wherein the processor is configured to execute the instructions as set forth in claim 1 when the image is generated, or when the image is acquired.

3. The electronic shelf label error detection apparatus according to claim 1, being a portable terminal.

4. The electronic shelf label error detection apparatus according to claim 3,
wherein the processor is configured to execute the instructions to output the image on a display screen of the portable terminal.

5. The electronic shelf label error detection apparatus according to claim 3,
wherein the processor is configured to execute the instructions to generate the image by a capture unit of the portable terminal.

6. An electronic shelf label error detection A control method performed by a computer, the method comprising
receiving an image captured by a camera;
recognizing a position of a product from the image in which products and a shelf label are imaged;
recognizing a position of the shelf label indicating information of the product from the image;
detecting an error in a relationship between the recognized position of the product and the recognized position of the shelf label based on a determination that the shelf label is outside a first distance from the recognized position of the product; and
controlling a display monitor to display the image in which a location including the position of the product related to the detected error is distinguishably displayed.

7. A non-transitory computer-readable storage medium storing a program causing a computer to perform an electronic shelf label error detection method comprising:
receiving an image captured by a camera;
recognize a position of a product from the image in which products and a shelf label are imaged;
recognize a position of the shelf label indicating information of the product from the image;
detect an error in a relationship between the recognized position of the product and the recognized position of the shelf label based on a determination that the shelf label is outside a first distance from the recognized position of the product; and
controlling a display monitor to display the image in which a location including the position of the product related to the detected error is distinguishably displayed.

* * * * *